(12) United States Patent
Hussain et al.

(10) Patent No.: US 8,845,273 B2
(45) Date of Patent: Sep. 30, 2014

(54) FLUID TRANSFER ARRANGEMENT

(75) Inventors: Zahid M. Hussain, Derby (GB);
Christopher T. J. Sheaf, Derby (GB);
Brian A. Handley, Derby (GB)

(73) Assignee: Rolls-Royce PLC, London (GB)

( * ) Notice: Subject to any disclaimer, the term of this patent is extended or adjusted under 35 U.S.C. 154(b) by 599 days.

(21) Appl. No.: 13/109,516

(22) Filed: May 17, 2011

(65) Prior Publication Data

US 2011/0296848 A1 Dec. 8, 2011

(30) Foreign Application Priority Data

Jun. 4, 2010 (GB) .................................. 1009338.3

(51) Int. Cl.
*F01D 25/12* (2006.01)
*H04L 12/06* (2006.01)
*F01D 5/18* (2006.01)

(52) U.S. Cl.
CPC ................ *F01D 5/188* (2013.01); *F01D 25/12* (2013.01); *H04L 12/06* (2013.01)
USPC ............................ 415/116; 415/175; 415/178

(58) Field of Classification Search
USPC .................. 415/116, 175–178; 137/808–811; 239/498, 504, 566
See application file for complete search history.

(56) References Cited

U.S. PATENT DOCUMENTS

| | | | |
|---|---|---|---|
| 4,525,998 A * | 7/1985 | Schwarz ...................... | 60/226.1 |
| 4,735,282 A | 4/1988 | Lippold | |
| 5,483,953 A | 1/1996 | Cooper | |
| 6,123,145 A * | 9/2000 | Glezer et al. ............. | 165/104.33 |
| 7,621,463 B2 | 11/2009 | Presz, Jr. et al. | |
| 2004/0255922 A1 | 12/2004 | Thorne | |
| 2006/0151633 A1* | 7/2006 | Presz et al. ..................... | 239/461 |
| 2010/0015879 A1 | 1/2010 | Davis | |
| 2010/0254861 A1* | 10/2010 | Castagnos et al. ............ | 422/139 |

FOREIGN PATENT DOCUMENTS

| | | |
|---|---|---|
| GB | 2 188 397 A | 9/1987 |
| JP | A-11-184420 | 7/1999 |
| JP | A-2008-18394 | 1/2008 |
| WO | WO 02/072421 A2 | 9/2002 |

OTHER PUBLICATIONS

Lee et al (International Journal of Heat and Mass Transfer 43 (2000) 3497-3509).*
Hoberg et al (International Journal of Heat and Fluid Flow 31 (2010) 460-467).*
British Search Report dated Sep. 30, 2010 issued in British Patent Application No. 1009338.3.

* cited by examiner

*Primary Examiner* — Edward Look
*Assistant Examiner* — Juan G Flores
(74) *Attorney, Agent, or Firm* — Oliff PLC

(57) ABSTRACT

A fluid transfer arrangement comprising a duct having a first end and a second end, a pulse generation mechanism located at the first end of the duct to direct fluid pulses towards the second end of the duct in use, and a baffle located at the second end of the duct that defines an aperture having sharp edges. The sharp edges generate ring vortex fluid flow from the aperture in use. Applications include impingement heating and cooling.

16 Claims, 3 Drawing Sheets

FLUID TRANSFER ARRANGEMENT

The present invention relates to a fluid transfer arrangement. It finds particular utility for impingement heating or cooling of components.

Known fluid transfer arrangements for impingement heating or cooling comprise ducting from a fluid source to a point close to the surface where the impingement is required. At least one aperture is provided at the end of the ducting to direct a fluid jet onto the surface, for example in a spray bar type of arrangement. In a gas turbine engine application, cooling air is diverted from the main gas flow path, for example from the compressors, and ducted to impingement cool parts of hot components including the combustor walls. Additionally or alternatively, hot air is extracted from a downstream portion of the gas flow path, for example from the turbines, and is ducted to components needing heating, such as for anti-icing or de-icing of the nacelle. Both these examples transfer high volume, low pressure fluid flow.

It reduces the efficiency of the gas turbine engine to extract air from the gas flow path and so the more cooling and heating requirements there are, the less efficient the engine can be. Another disadvantage of known fluid transfer arrangements is that the ducting increases cost and weight of the system. Weight is particularly problematic in airborne applications. To transfer sufficient fluid for a given application, the ducting may need to have a large diameter. However, this may be difficult to provide in some applications where there are tight space constraints.

A further disadvantage of known fluid transfer arrangements for impingement heating or cooling is the sensitivity of the arrangement to the spacing between the aperture directing the fluid jet and the surface being impinged by the jet. This increases the manufacturing cost, as the tolerances must be small, and means that the arrangement is sensitive to changes in the spacing caused, for example, by differential expansion.

The present invention provides a fluid transfer arrangement that seeks to address the aforementioned problems.

Accordingly a first aspect of the present invention provides a fluid transfer arrangement comprising a duct having a first end and a second end, a pulse generation mechanism located at the first end of the duct to direct fluid pulses towards the second end of the duct in use, and a baffle located at the second end of the duct that defines an aperture having sharp edges, wherein the sharp edges generate ring vortex fluid flow form the aperture in use.

This has the advantage that the ring vortex fluid flow is coherent and travels further than prior art arrangements thereby transferring fluid more efficiently and effectively across a gap.

The area of the aperture may be less than the cross-sectional area of the duct adjacent to the aperture.

The aperture may be circular or annular. The baffle may be an annular disc, a circular disc or a bullet faring. The latter causes the fluid pulses to accelerate before reaching the aperture.

The duct may be tubular or frustoconical. A tubular duct is simple and cheap to manufacture. A frustoconical duct may have straight sides or curved sides. The duct may be wider at its first end than its second end or may be wider at its second end than its first end. The former accelerates the fluid pulses whereas the latter generates larger ring vortices.

The duct may comprise a manifold and the baffle may define more than one aperture.

The pulse generation mechanism may comprise an oscillating diaphragm, an oscillating piston or a resonating valve. The resonance can be generated mechanically or fluidically.

A second aspect of the present invention provides a fluid transfer arrangement comprising a manifold, a plurality of ducts extending from the manifold to direct fluid pulses towards the distal end of the plurality of ducts in use, each duct having a baffle located at the distal end to the manifold, and each baffle defining an aperture having sharp edges, wherein the sharp edges generate ring vortex fluid flow from the aperture in use.

The optional features relating to the first aspect can also be applied separately or in combination to the second aspect of the present invention.

The present invention also provides an impingement heating arrangement comprising a fluid transfer arrangement according to the first or second aspect and a surface to be impingement heated located to receive the ring vortex fluid flow from the aperture in use. Beneficially, the impingement heating arrangement may be used to provide anti-icing heating for a gas turbine engine nacelle.

Similarly, the present invention also provides an impingement cooling arrangement comprising a fluid transfer arrangement according to the first or second aspect and a surface to be impingement cooled located to receive the ring vortex fluid flow from the aperture in use. Beneficially, the impingement cooling arrangement may be used to impingement cool electrical or electronic components.

The present invention also provides a gas turbine engine comprising a fluid transfer arrangement according to the first or second aspect.

The present invention will be more fully described by way of example with reference to the accompanying drawings, in which.

Figure 1:
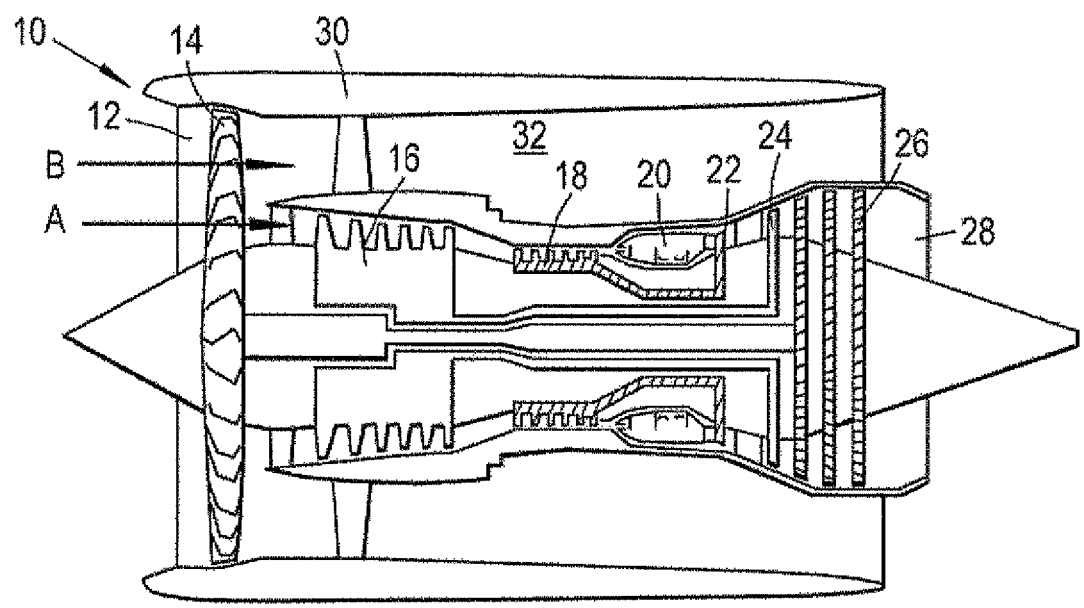
FIG. 1 is a sectional side view of a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32. Impingement cooling is provided in the combustor 20 and the turbine casing. Impingement heating is provided on the nacelle 30 near the air intake 12.

Figure 2:
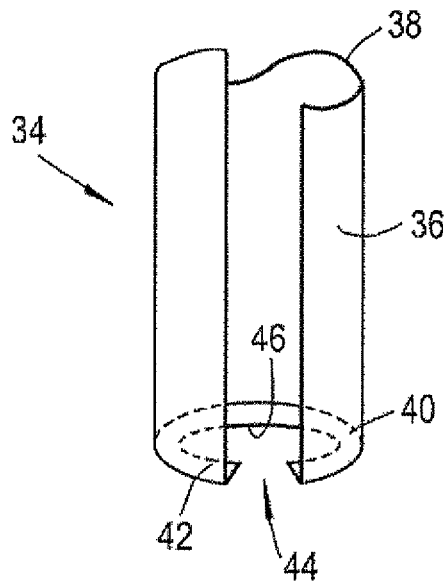
FIG. 2 is a perspective cut away view of a fluid transfer arrangement according to the present invention.

A first embodiment of the fluid transfer arrangement 34 of the present invention is shown in FIG. 2. The fluid transfer arrangement 34 comprises a duct 36 that is tubular and has a first end 38 that is coupled to a fluid source (not shown) and a second end 40. A pulse generation mechanism (not shown) is located at the first end 38 of the duct 36.

The pulse generation mechanism may be an oscillating diaphragm that causes a fluid pulse to travel along the duct 36 towards the second end 40 each time the diaphragm oscillates towards the duct 36. Alternatively the pulse generation mechanism may be an oscillating piston or a mechanical valve that is oscillated by hydraulic, pneumatic or electrical means or that resonates in response to the action of the fluid through a reed or flap. Other known forms of pulse generation may be used as the mechanism including non-mechanical arrangements such as pipe resonance and fluidic valving.

A baffle 42 is provided at the second end 40 of the duct 36. In the first embodiment the baffle 42 is in the form of an annular plate that extends inwardly from the tubular wall of the duct 36 towards the duct's axis of rotation. The baffle 42 thus defines a circular aperture 44 that is preferably centred on the axis of rotation of the duct 36. The aperture 44 is defined by a sharp edge 46 to the baffle 42. The components are arranged such that the area of the aperture 44 is less than the cross-sectional area of the duct 36. This arrangement is advantageous because it is simple to construct and therefore relatively cheap.

The interaction of the fluid pulses from the pulse generation mechanism with the sharp edge 46 of the baffle 42 acts to generate ring vortex fluid flow from the aperture 44 away from the duct 36. A discrete ring vortex is generated for each fluid pulse travelling along the duct 36 towards the second end 40. Thus, when the pulse generation mechanism is oscillating or vibrating in a regular pattern, for example at a predetermined frequency, the fluid transfer arrangement 34 generates a train of discrete ring vortices that are propelled away from the second end 40 of the duct 36. Vortices are more coherent than direct jets of fluid, particularly when travelling through the same fluid from which they are composed, and are therefore more persistent than direct jets. This means that a train of ring vortices can travel longer distances or arrive at a specified location with less energy loss than a direct jet because there is less mixing between the ring vortex and the surrounding fluid.

In more detail, the fluid pulses travelling from the first end 38 to the second end 40 of the duct 36 have a given velocity, dependent on the velocity imparted by the pulse generation mechanism. When each fluid pulse reaches the second end 40 of the duct 36 the fluid close to the tubular wall of the duct 36 stalls on the lip created by the baffle 42. This fluid therefore has a raised pressure compared to the fluid near the centre of the duct 36. Fluid dynamics teaches that the fluid will move to try to equalise the pressure so the fluid tends to inwards from the tubular wall, adhere somewhat to the baffle 42 and then roll off the sharp edge 46 to begin the ring vortex flow away from the duct 36. Additional fluid pulses will form subsequent ring vortices.

For impingement heating or cooling applications, a surface to be impinged is provided facing the second end 40 of the duct 36. Preferably the plane of the surface is parallel to the plane of the aperture 44, and perpendicular to the axis of the duct 36. In this arrangement the fluid transfer is greatest. However, other angles of the surface relative to the fluid transfer arrangement 34 are feasible and will result in at least some of the benefits of the present invention. The ring vortices generated by the fluid transfer arrangement 34 therefore travel across the void between the second end 40 of the duct 36 and the surface, which may be filled with a fluid that is the same or different to the fluid flowing through the fluid transfer arrangement 34. Each ring vortex impinges against the surface to provide heating or cooling depending on the relative temperature of the fluid and the surface.

The ring vortices lose less energy than direct jets because they mix less with the surrounding fluid and instead cohere to themselves. Therefore the fluid transfer arrangement 34 can transfer fluid across a greater distance than was possible with prior art arrangements. Alternatively, the ring vortices impinge with greater force and therefore deliver greater heating or cooling impingement than prior art arrangements when travelling the same distance before impingement. A mixture of these advantages can also be realised by increasing the distance to be traveled by the impingement jet a modicum, but less than the total distance possible with the present invention.

Figure 3:
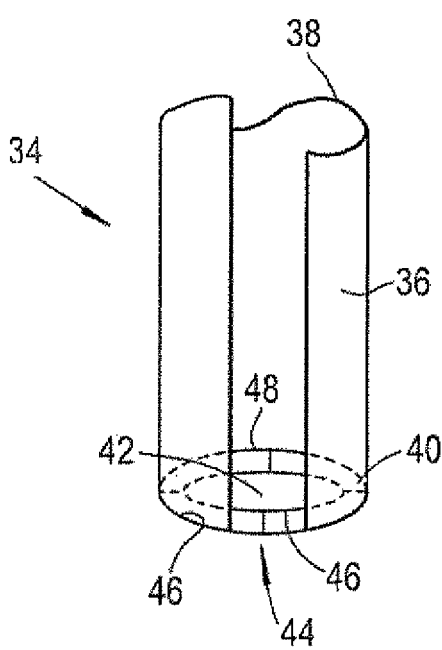
FIG. 3 is a perspective cut away view of another fluid transfer arrangement according to the present invention.

A second embodiment of the fluid transfer arrangement 34 is shown in FIG. 3. The fluid transfer arrangement 34 comprises a duct 36 with a first end 38 and a second end 40 as in the first embodiment. A pulse generation mechanism is provided at the first end 38 to direct fluid pulses towards the second end 40 of the duct 36. The second embodiment differs from the first embodiment in that the baffle 42 comprises a circular plate with connection members 48 attaching the baffle 42 to the tubular wall of the duct 36 at the second end 40. The baffle 42 and duct 36 therefore define an annular aperture 44 that has sharp edges 46 formed by the edge of the circular plate baffle 42 and the second end 40 of the duct 36. The circular plate baffle 42 is preferably concentric with the duct 36 but may, in the alternative, be offset from the rotational axis of the duct 36.

The second embodiment of the fluid transfer arrangement 34 works in similar fashion to the first embodiment in that fluid pulse travel along the duct 36 towards the second end 40 where a part of the flow stalls on the baffle 42 and therefore causes the fluid pulse to roll off the baffle 42 to form a ring vortex as it travels away from the duct 36. However, because the baffle 42 is a centrally located circular plate, rather than the annular plate of the first embodiment, the fluid flow is rolled radially outwardly from close to the axis so that the vortex spins in the opposite sense. Nevertheless, the effect is the same as for the first embodiment, namely that a coherent and persistent train of ring vortices is produced by the interaction of each fluid pulse with the sharp edges 46 of the baffle 42 and the second end 40 of the duct 36.

Figure 4:
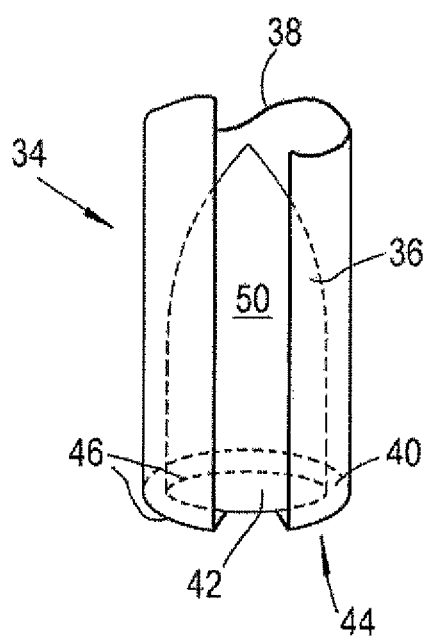
FIG. 4 is a perspective cut away view of another fluid transfer arrangement according to the present invention.

A third embodiment of the fluid transfer arrangement 34 is shown in FIG. 4 in which the duct 36 remains as in the first and second embodiments. The baffle 42 is formed as the flat end of a bullet fairing 50 positioned within the duct 36, preferably concentrically therewith. The bullet fairing 50 may be solid or hollow and may be attached to the tubular wall of the duct 36 by connection members 48 (not shown). The wall of the bullet fairing 50 tapers from the baffle 42 that is planar with the second end 40 of the duct 36 to a point. The point is closer to, but preferably not located at, the first end 38 of the duct 36. The bullet fairing 50 causes the fluid pulses from the pulse generation mechanism to accelerate as they travel from the first end 38 towards the second end 40 of the duct 36. This imparts more kinetic energy to the aperture 44, which enables a lower energy pulse generation mechanism to be used, whereas other embodiments impart higher pressure at the aperture 44. The baffle 42 end of the bullet fairing 50 has a sharp edge 46 as does the second end 40 of the duct 36. The interaction of the fluid pulses with the sharp edges 46 causes ring vortices to form and to travel in a train away from the fluid transfer arrangement 34.

Figure 5:
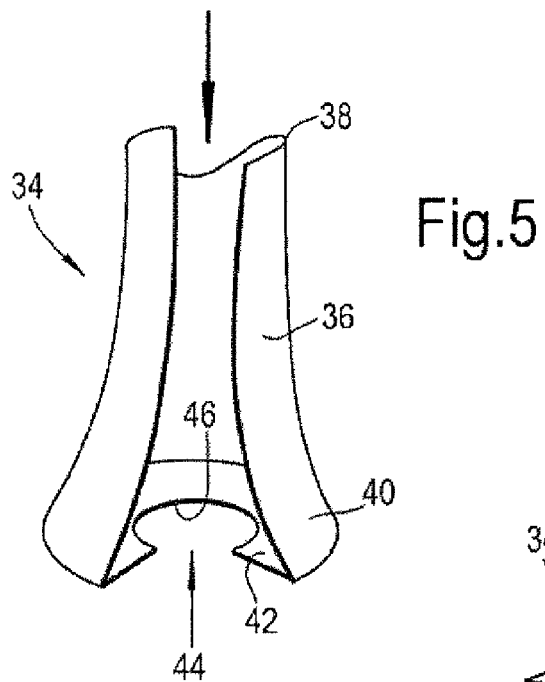
FIG. 5 is a perspective cut away view of another fluid transfer arrangement according to the present invention.
Figure 6:
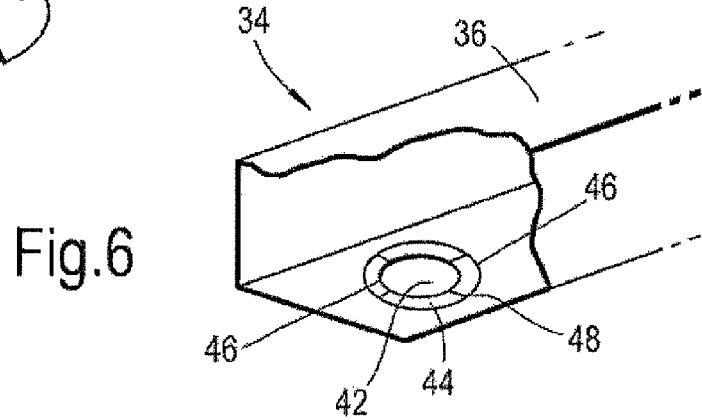
FIG. 6 is a perspective cut away view of another fluid transfer arrangement according to the present invention.
Figure 7:
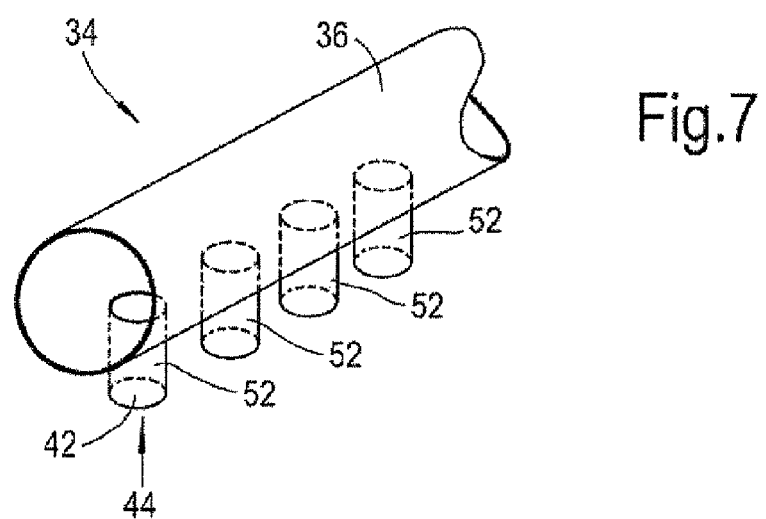
FIG. 7 is a perspective cut away view of another fluid transfer arrangement according to the present invention.

A fourth embodiment of the fluid transfer arrangement 34 is shown in FIG. 5 in which the duct 36 is frustoconical, rather than tubular as in the first three embodiments, such that it has a larger diameter at its second end 40 than its first end 38. As illustrated the duct 36 is flared; it has curved sides so that the angle to the rotational axis increases from the first end 38 to the second end 40 of the duct 36. However, alternatively the sides of the duct 36 may be straight so that the angle between the side and the rotational axis is constant. The baffle 42 is an annular plate with a sharp edge 46 to form a circular aperture 44 that is preferably concentric with the duct 36. Alternatively the baffle 42 may be a circular plate with connection members 48 to form an annular aperture 44 as in the second embodiment, or may be a bullet fairing 50 as in the third embodiment or a modified bullet fairing 50 with an exterior shape that mirrors the shape of the duct 36. This embodiment of the duct 36 forms larger vortices that have a shorter range than other embodiments. Larger vortices may be beneficial in dispersing particulates.

Alternatively the duct 36 may be frustoconical with a larger diameter at its first end 38 than its second end 40. As described above, the sides of the duct 36 may be straight or curved. This shape of the duct 36 causes the fluid pulses to accelerate as they travel from the first end 38 to the second end 40 of the duct 36. This increases the pressure differential between the stalled and non-stalled portion of each fluid pulse and therefore allows for optimisation of the size and velocity of the ring vortices. In particular, the convergent duct 36 forms vortices that spin faster than in other embodiments and therefore travel further.

A fifth embodiment of the fluid transfer arrangement 34 of the present invention is shown in FIG. 6. In this embodiment the duct 36 comprises a manifold that defines, with baffles 42 in the form of circular plates with sharp edges 46, a plurality of apertures 44. Each aperture 44 in the array is annular. The baffles 42 are attached to the wall of the manifold duct 36 by connection members 48, as in the second embodiment. As illustrated the manifold duct 36 has square or rectangular cross-section but the skilled reader will readily understand that other cross-sectional shapes may be provided with comparable felicity.

In the fifth embodiment the pulse generation mechanism may be located at one end of the manifold duct 36 or may be located in the wall of the manifold duct 36 opposite the apertures 44. Alternatively it may be located in a supply duct that feeds into the manifold duct 36 either from an end or into the wall opposite to the apertures 44.

A sixth embodiment of the fluid transfer arrangement 34 is shown in FIG. 7. As in the fifth embodiment, the duct 36 is in the form of a manifold, in this embodiment having a circular cross-section. A plurality of ducts 52 extend from the manifold duct 36 to form an array. Each duct 52 has a baffle 42 located at the distal end to the manifold duct 36 which can take any of the forms discussed for previous embodiments. Each baffle 42 defines an aperture 44 having sharp edges 46 that interact with fluid pulses to generate ring vortices that travel away from the ducts 52. At least one pulse generation mechanism is provided (not shown) to direct fluid pulses towards the distal end of each duct 52. The at least one pulse generation mechanism may be located in the manifold duct 36 or in a supply duct thereto. Alternatively there may be a pulse generation mechanism at the end of each duct 52 where it is joined to the manifold duct 36.

The fluid transfer arrangement 34 of the present invention can advantageously be used to replace pipes in some applications, thereby reducing the weight and cost of the application. In other applications, it enables fluid transfer in locations where it is not possible to use pipes due to the space restrictions or the variation in the gap across which fluid is to be transferred. The fluid transfer arrangement 34 of the present invention is beneficially insensitive to the gap size and so is able to function across a wider range of operating conditions.

It will be apparent to the skilled reader that modifications and alterations to the described embodiments will also fall within the scope of the claimed invention. For example, other shapes of duct 36 and baffle 42 can achieve the advantages of the present invention.

The fluid transfer arrangement 34 of the present invention finds particular utility for impingement heating or cooling applications. It is especially envisaged that the present invention can be put into effect in a gas turbine engine 10, for example for more efficient impingement cooling of the combustor walls or for anti-icing impingement heating of the nacelle 30. However, other applications are feasible for the fluid transfer arrangement 34 according to the present invention, including dispersal of aerosols, cooling of electronic and electrical components, and transferring one fluid through a different fluid without significant mixing. For example, it may be feasible to transfer exhaust gases or other contaminated fluids through a clean gas or fluid without contaminating the clean gas or fluid, as is required in gas turbine engine breather ducts.

The present invention can be optimised to produce vortices in the spectrum from a slow, well spaced train of large diameter vortices to a narrowly spaced, rapid train of small vortices as the application demands. Thus to cool components that tend to overheat rapidly, a train of small vortices arriving in quick succession is appropriate, whereas to disperse a particulate material it is more appropriate to use a train of large, relatively infrequent vortices. Other applications of and modifications to the fluid transfer arrangement 34 of the present invention will be apparent to the skilled reader and are encompassed within the scope of the claims.

The invention claimed is:

1. An impingement heating or cooling arrangement comprising a manifold, a plurality of ducts extending from the manifold, at least one pulse generation mechanism to direct fluid pulses towards the distal end of the plurality of ducts in use, each duct having a baffle located at the distal end to the manifold, and each baffle defining an aperture having sharp edges, wherein the sharp edges generate ring vortex fluid flow from the aperture in use.

2. An impingement heating or cooling arrangement as claimed in claim 1 wherein the area of the aperture is less than the cross-sectional area of the duct adjacent to the aperture.

3. An impingement heating or cooling arrangement as claimed in claim 1 wherein the aperture is circular.

4. An impingement heating or cooling arrangement as claimed in claim 1 wherein the aperture is annular.

5. An impingement heating or cooling arrangement as claimed in claim 1 wherein the baffle is an annular disc.

6. An impingement heating or cooling arrangement as claimed in claim 1 wherein the baffle is a circular disc.

7. An impingement heating or cooling arrangement as claimed in claim 1 wherein the baffle comprises a bullet fairing.

8. An impingement heating or cooling arrangement as claimed in claim 1 wherein at least one of the ducts is tubular.

9. An impingement heating or cooling arrangement as claimed in claim 1 wherein at least one of the ducts is frustoconical.

10. An impingement heating or cooling arrangement as claimed in claim 9 wherein at least one of the ducts has straight sides.

11. An impingement heating or cooling arrangement as claimed in claim 9 wherein at least one of the ducts has curved sides.

12. An impingement heating or cooling arrangement as claimed in claim 9 wherein at least one of the ducts is wider at its first end than its second end.

13. An impingement heating or cooling arrangement as claimed in claim 9 wherein at least one of the ducts is wider at its second end than its first end.

14. An impingement heating or cooling arrangement as claimed in claim 1 wherein the pulse generation mechanism comprises one of the group comprising an oscillating diaphragm, an oscillating piston and a resonating valve.

15. An impingement heating or cooling arrangement as claimed in claim 1 and a surface to be impingement heated or cooled located to receive the ring vortex fluid flow from the aperture in use.

16. A gas turbine engine comprising an impingement heating or cooling arrangement as claimed in claim 1.

* * * * *